Sept. 15, 1970 3,528,278
METHOD AND APPARATUS FOR DETERMINING THE PRESENCE OF VAPOR IN A GAS
Filed Sept. 5, 1967 2 Sheets-Sheet 1
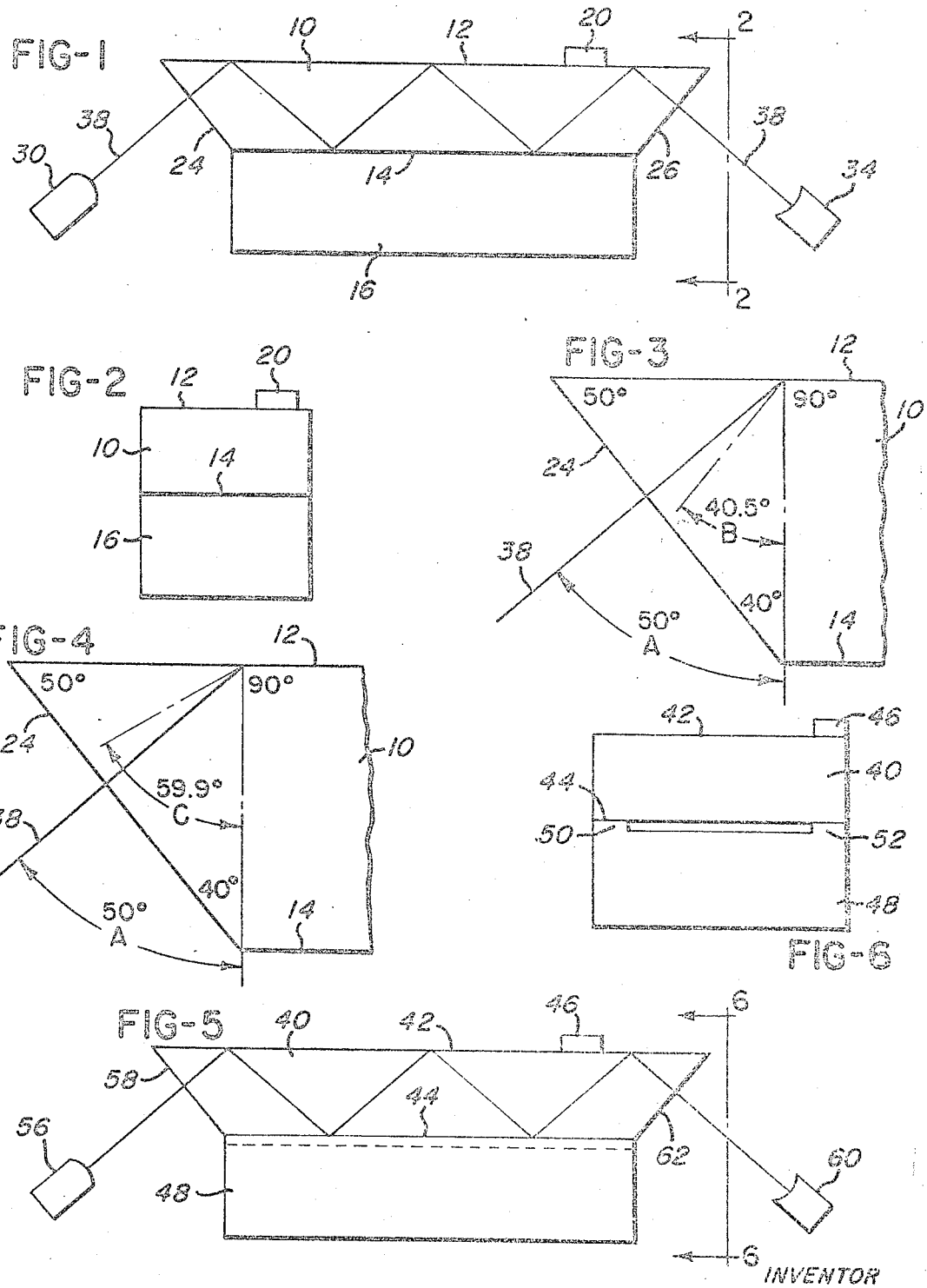
INVENTOR
JOHN JEROME STERLING
BY William R Jacox
ATTORNEY

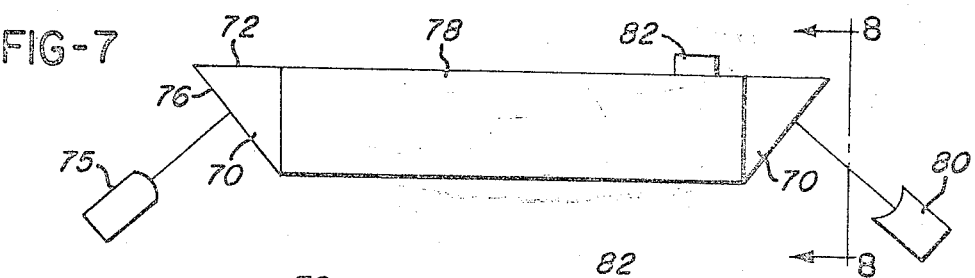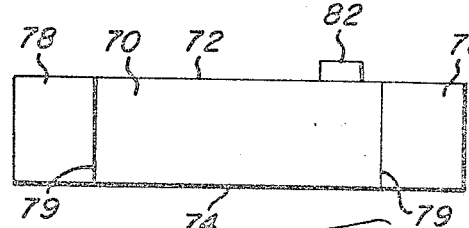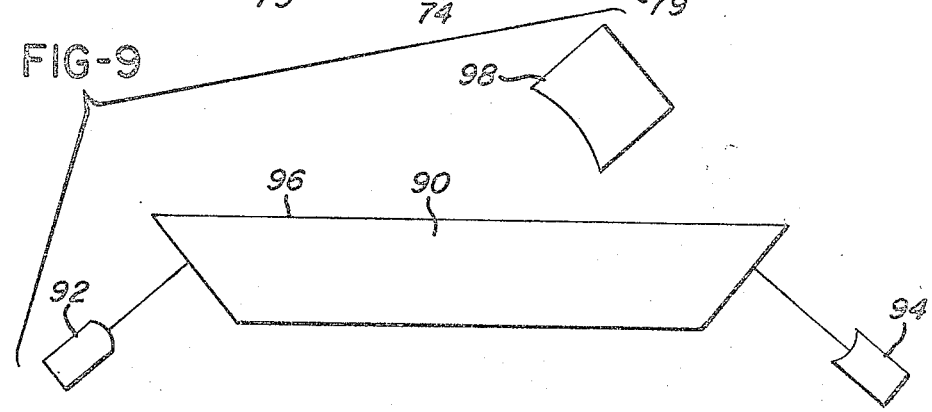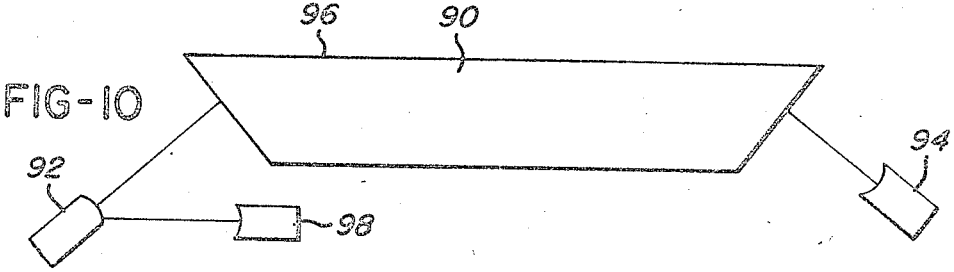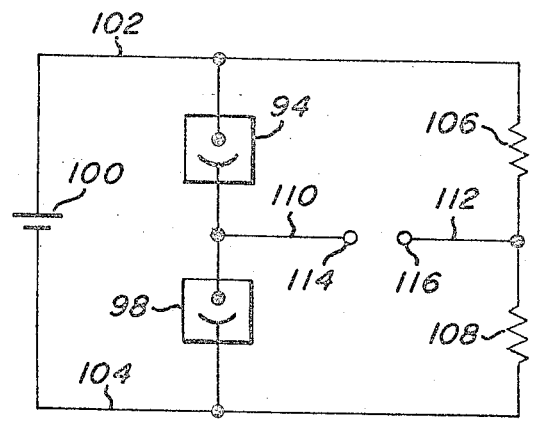

United States Patent Office 3,528,278
Patented Sept. 15, 1970

3,528,278
METHOD AND APPARATUS FOR DETERMINING THE PRESENCE OF VAPOR IN A GAS
John Jerome Sterling, Yellow Springs, Ohio, assignor to Technology Incorporated, Dayton, Ohio, a corporation of Ohio
Filed Sept. 5, 1967, Ser. No. 665,570
Int. Cl. G01n 25/02
U.S. Cl. 73—17
19 Claims

ABSTRACT OF THE DISCLOSURE

Apparatus and method for determining the presence of vapor in a gas. One of the uses of this invention is the determination of the dew point of the air of the atmosphere. In this invention optical principles are employed. A translucent body and a source of radiant energy are employed. Light energy enters the translucent body and engages a surface thereof at such an angle of incidence that it is normally substantially totally reflected internally. However, if the translucent body has condensed vapor or condensate thereupon, such as is formed by dew, some of the light energy which engages the surface is refracted therethrough and a lesser amount of the energy is reflected therefrom. Means are provided for sensing the flow of reflected energy.

BACKGROUND OF THE INVENTION

Numerous methods and apparatus have been devised for determining the dew point of the air of the atmosphere or the presence of condensed vapor in a gas. However, most of the methods and apparatus are complex and/or time consuming. Furthermore, some types of apparatus for determining dew point will operate satisfactorily only in complete darkness.

An object of this invention is to provide apparatus and a method for quickly and readily determining the dew point of the atmosphere or the presence of condensed vapor in a gas.

Another object of this invention is to provide such apparatus which operates satisfactorily under any reasonable conditions of light and which does not require darkness for proper operation.

Other objects and advantages reside in the construction of the invention, combinations thereof, the method of manufacture, and the mode of operation, as will become more apparent from the following description.

SUMMARY OF THE INVENTION

This invention uses optical principles.

The apparatus of this invention comprises a body of translucent material. The body may be a solid body such as a crystalline body. Radiant energy in the form of light energy is directed into the body at such an angle that reflection within the body normally occurs. However, if dew forms upon a surface of the body of translucent material some of the radiant energy which enters the body is refracted from the body and is not reflected therefrom. Means are provided for sensing the radiant energy which is reflected through the translucent body.

BRIEF DESCRIPTION OF THE DRAWING

FIG. 1 is a diagrammatic side view of apparatus of this invention for determining dew point or the presence of condensed vapor in a gas.

FIG. 2 is a view taken substantially on line 2—2 of FIG. 1.

FIG. 3 is a diagrammatic view illustrating the conditions present in the apparatus of this invention when condensed vapor does not exist on the apparatus.

FIG. 4 is a diagrammatic view illustrating the conditions present in the apparatus of this invention when condensed vapor exists on the apparatus.

FIG. 5 is a diagrammatic side view of other apparatus of this invention for determining dew point or the presence of condensed vapor in a gas.

FIG. 6 is a view taken substantially on line 6—6 of FIG. 5.

FIG. 7 is a diagrammatic side view of other apparatus of this invention for determining the dew point or the presence of condensed vapor in a gas.

FIG. 8 is a view taken substantially on line 8—8 of FIG. 7.

FIG. 9 is a diagrammatic view showing other apparatus of this invention.

FIG. 10 is a diagrammatic view showing other apparatus of this invention.

FIG. 11 is a schematic view of electrical circuitry which may be employed in combination with the apparatus of FIGS. 9 and 10.

DESCRIPTION OF THE EMBODIMENTS

FIG. 1 shows a body 10 of translucent material. As defined herein, the "body of translucent material" is a body of material which has the capability of transmission or transmittance of light energy therethrough. Herein "light energy" includes radiant energy having wave lengths within the spectrum from ultraviolet through the infrared. The light energy may have any wave length which is substantially within the range of from .1 micron to 80 microns. Preferably, the translucent material of the body 10 is one which has relatively high thermal conductivity and low specific heat. Single crystal quartz, fused silica, and "Lucite" have been found to be very satisfactory. Other materials, such as sapphire and diamond or the like may also be satisfactory.

The body 10 of translucent material is provided with opposed surfaces 12 and 14. The surface 14 is provided with a coating of any good reflective material.

Means are provided for reducing the temperature of the body 10. A suitable cooling member or refrigerator 16 is shown in firm engagement with the surface 14 of the body 10. The cooling member 16 may be any cooling or refrigeration means, such as a thermoelectric cooler or the like, the temperature of which can be easily and readily controlled.

The cooling member 16 is capable of cooling the body 10 at a reasonable rate.

Any suitable means may be used to sense the temperature of the surface 12. Herein a temperature sensing member 20, such as a thermometer, thermistor, thermocouple, or the like is shown in engagement with the surface 12 of the body 10, or the sensing member 20 may be located in any other suitable position to sense the temperature of the surface 12.

The body 10 also has surfaces 24 and 26 at opposite ends thereof. Adjacent the surface 24 is a source of radiant energy or light energy 30. As stated above, the light energy emitted from the source 30 may be any radiant energy in the spectrum within the range of from substantially .1 micron to 80 microns in wave length. Adjacent the surface 26 is a radiant energy detecting unit or light energy sensing unit 34. The sensing unit 34 may be photodetector means, or any means which is capable of indicating and/or measuring the flow of radiant energy received thereby.

A translucent material is selected which is capable of transmission of light energy of the wave length which is produced by the source 30, or a light energy source is selected which has a wave length which can be transmitted by a given body of translucent material. The sensing unit 34 is one which is sensitive to the frequency of the light energy which is produced by the source 30.

In other words, the light source 30, the translucent material of the body 10, and the sensing unit 34 are "matched" for cooperative operation thereof.

OPERATION

It is to be understood that the structure of this invention may be employed to determine the dew point or the presence of condensed vapor in any gas. However, for purposes of illustration the operation of the apparatus of this invention is described in use to determine the dew point of the atmosphere.

When the body 10 is disposed in the atmosphere, air of the atmosphere, of course, engages the surface 12 of the body 10. When the temperature of the body 10 is above the dew point of the air, the surface 12 is relatively dry. Thus, a translucent material-air interface exists at the surface 12.

Light energy (defined above) is directed from the source 30, through the surface 24 and into the body 10, as indicated by a ray 38. In order to eliminate as much reflection as possible at the surface 24, the light energy ray 38 is directed into the body 10 through the surface 24 at an angle which is substantially normal to the surface 24, as illustrated in FIG. 3. The light ray 38 thus travels through the body 10 to the surface 12 thereof.

FIGS. 3 and 4 illustrate the following conditions which exist with regard to the apparatus when quartz, for example, is employed as the body 10 of translucent material in determining the dew point of the air of the atmosphere.

| Interface: | Critical angle |
| --- | --- |
| Quartz, gas | 40.5° (B) |
| Quartz, water | 59.9° (C) |

Angle of incidence of the ray 38 = 50° (A).

In accordance with Snell's Law, if the angle of incidence of the ray 38 with respect to the surface 12 is greater than the critical angle of the interface at the surface 12, the ray 38 is substantially totally reflected within the body 10.

As shown in FIG. 3, the angle of incidence A of the ray 38 with respect to the surface 12 is selected to be 50 degrees and is greater than the critical angle B of 40.5 degrees at the translucent material-air interface provided at the surface 12. Therefore, the ray 38 is substantially totally reflected at the translucent material-air interface, as illustrated in FIG. 1. Thus, the ray 38 is reflected from the surface 12 and engages the surface 14 which has reflective material applied thereto. The reflective material upon the surface 14 causes the ray 38 to be reflected back toward the surface 12. The ray 38 is reflected between the surfaces 12 and 14, as illustrated in FIG. 1, until the ray 38 passes from the body 10 through the surface 26, which is shown as being substantially normal to the direction of travel of the ray 38 in order to substantially eliminate reflection which may occur at the surface 26.

The ray 38 passes from the body 10 into the radiant energy detector or sensing unit 34.

It is to be understood, of course, that a multiplicity of rays, such as the ray 38, actually move from the source of light energy 30 and flow into the body 10, as illustrated by the ray 38. Thus, a multiplicity of rays, such as the ray 38, are emitted from the body 10 and flow into the detector unit 34. Thus, a given value of light energy is indicated or measured by the radiant energy detector or sensing unit 34.

When it is desired to determine the dew point of the air of the atmosphere within which the body 10 is disposed, the cooling member 16 is operated. Thus, the temperature of the body 10 is gradually reduced, and the temperature of the surface 12 is gradually lowered, as is the temperature of the air which is in engagement with the surface 12.

When the temperature of the air which is in engagement with the surface 12 of the body 10 is lowered to the dew point, condensate forms upon the surface 12. When such condensate forms upon the surface 12, a translucent material-air interface no longer exists at the surface 12, but a translucent material-condensate interface exists at the surface 12. Each droplet of condensate upon the surface 12 of the body 10 becomes part of an interface which interface has a critical angle C of 59.9 degrees, as illustrated in FIG. 4. Therefore, the critical angle C of 59.9 degrees is greater than the angle of incidence A of 50 degrees of the rays 38 with respect to the surface 12. Therefore, at least some of the rays 38, which engage the surface 12 are refracted therethrough and travel into the atmosphere. Such rays, of course, are not reflected to the surface 14. Therefore, the value of light energy which reaches the detector unit 34 is considerably reduced. Such reduction of light energy is indicated or measured by the detector unit 34.

At the moment that the detector unit 34 indicates that a reduction in the light energy received thereby has occurred, the dew point of the air of the atmosphere exists, and the temperature of the surface 12 is determined by the temperature sensing member 20. Thus, the dew point of the air in the atmosphere is determined.

FIGS. 5 AND 6

FIGS. 5 and 6 show a translucent body 40 which has opposed surfaces 42 and 44. A thermal detector or indicator 46 is in engagement with the surface 42, or the detector or indicator 46 may be positioned in any other suitable location to sense the temperature of the surface 42. As shown in FIG. 6, a cooler member 48 has portions 50 and 52 in firm engagement with the surface 44 of the body 40, and space exists between the portions 50 and 52 of the cooler member 48. Thus, air of the atmosphere engages a portion of the surface 44, as well as the surface 42. Thus, there is normally a translucent material-air interface formed at a portion of the surface 44, as well as at the surface 42.

A source of light energy 56 is adjacent a surface 58 of the body 40 and a light energy detector 60 is adjacent a surface 62 of the body 40.

Under normal conditions light energy travels from the source 56 into the body 40 and is reflected between the surfaces 42 and 44, and moves from the body 40 through the surface 62. The light energy thus moves from the surface 62 to the detector 60. Therefore, a given value of radiant energy is indicated or measured by the detector 60.

However, when the cooler member 48 is operated to lower the temperature of the body 40, vapor condenses on the surface 42 and on the exposed portion of the surface 44. Thus, the interface at the surfaces 42 and 44 changes from a translucent material-air interface to a translucent material-condensate interface. Thus, the critical angle of each interface is different and a portion of the light energy passes through the surfaces 42 and 44 and is not reflected to the detector 60. Thus, the detector 60 indicates or measures the fact that a reduction in the value of the light energy has occurred and that the dew point exists. At that time the thermal detector 46 indicates the temperature of the surface 42, and thus the dew point of the air of the atmosphere is determined.

FIGS. 7 AND 8

FIGS. 7 and 8 show a body 70 of translucent material which has opposed surfaces 72 and 74. A source of radiant energy 75 discharges light energy into the body 70 through a surface 76 thereof.

Cooler apparatus 78 is shown in engagement with each of opposite side surfaces 79 of the body 70. Thus, each of the opposed surfaces 72 and 74 has air of the atmosphere in engagement therewith. Therefore, a translucent material-air interface normally exists at each of the surfaces 72 and 74. Thus, under normal conditions substantially all of the light energy from the source 75 is reflected through the body 70 between the surfaces 72 and 74 and is received by a detector 80.

However, when the cooler apparatus 78 cools the body 70 to the dew point, vapor condenses on the surfaces 72 and 74 so that a translucent material-condensate interface is thus created at the surfaces 72 and 74. Therefore, a portion of the light rays which enter the body 70 from the source 75 are refracted through the surfaces 72 and 74. Therefore, the condensate condition which exists is indicated by a reduction in light energy which reaches the detector 80. At the same time the temperature of the surface 72 is determined by a thermal sensing element 82 which is in firm engagement therewith. Thus, the dew point of the air in the atmosphere is determined.

It is to be understood that the structure of this invention also may be employed to determine the presence of vapor in any gas. The apparatus of this invention may be used to determine the presence of vapor in a gas under pressure as the body of translucent material is sealed within or as a part of a container of such a gas. It is also to be understood that any suitable means may be provided to reduce the temperature of the body of translucent material which is a part of the apparatus of this invention.

It is also to be understood that any suitable feedback control system or arrangement, not shown, may be connected to cooler apparatus, such as members 16, 48, or 78 or other means for controlling the temperature of a translucent body of this invention, to automatically maintain the temperature of the translucent body at the dew point of the gas. Thus, the dew point of a gas is constantly available for reading thereof.

FIGS. 9, 10, AND 11

FIG. 9 shows a body 90 of translucent material. A source of radiant energy 92, which is adjacent the body 90, discharges light energy into the body 90. A detector 94 adjacent another portion of the body 90 is adapted to receive light energy which is emitted from the body 90 and which is reflected therethrough, as discussed above with respect to the bodies 10, 40, and 70.

The body 90 has a surface 96 which is exposed to a gas, the dew point of which is to be determined. The temperature of the body 90 is controlled by any suitable means, not shown. When the temperature of the body 90 is above the dew point of the gas which is in engagement with the surface 96, light energy which is discharged into the body 90 by the source 92 is reflected through the body 90 and is emitted therefrom to the detector 94.

However, when the temperature of the body 90 is lowered to the dew point of the gas in engagement therewith, vapor condenses on the surface 96. Therefore, at least some of the light energy which is discharged into the body 90 from the source 92 is refracted through the interface formed at the surface 96.

A detector 98 is positioned adjacent the surface 96 and is adapted to receive light energy which is refracted through the interface at the surface 96.

FIG. 10 shows the body of translucent material 90, the light energy source 92, and the detector 94, positioned in the same manner as shown in FIG. 9. However, in FIG. 10 the detector 98 is positioned adjacent the source 92 and directly receives a given portion of the light energy discharged therefrom.

The detectors 94 and 98 may be arranged in a balancing or comparator circuit illustrated in FIG. 11. The detectors 94 and 98 in series relationship are connected by conductors 102 and 104 to a source of electrical energy 100. Impedance members 106 and 108 are connected in series across the detectors 94 and 98 to form a bridge type of circuit.

A conductor 110 is connected to the midpoint between the detectors 94 and 98, and a conductor 112 is connected to the midpoint between the impedance members 106 and 108. Terminals 114 and 116 are connected to the conductors 110 and 112, respectively. A suitable instrument may be connected to the terminals 114 and 116 to read, sense, or control the comparative light energy received by the detectors 94 and 98. Thus, the circuit of FIG. 11 may be used to compensate for changes in voltage applied to the source 92 or to compensate for aging or other changes in the source 92 or in either of the detectors 94 or 98.

By proper shielding of the inlet and outlet surfaces, such as the surfaces 24 and 26 shown in FIG. 1, and by proper shielding of the detector 34, the body 10 of translucent material may be positioned within any reasonable light conditions and operation of the apparatus is not affected. This is due to the fact that substantially all extraneous light which flows through the surface 12 of the translucent body 10 is refracted into the translucent body 10 at an angle less than the critical angle of the gas-translucent material interface at the surface 12. Therefore, refraction of extraneous light occurs and such light flows through the body 10 to the surface 14, is reflected therefrom, and returns to the surface 12, through which the light is again refracted, because the angle of incidence of the light at the surface 12 is less than the critical angle of the interface. Therefore, no appreciable extraneous light flows to the detector 34.

It is to be understood that the apparatus of this invention may be employed to sense the frost point of a gas.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. Apparatus for determining dew point of the air of the atmosphere comprising:

a body of translucent material which is capable of transmission of radiant energy therethrough, the radiant energy having a wave length substantially within the range of from .1 micron to 80 microns, the body of translucent material having a first surface portion which is exposed to the atmosphere, the body of translucent material having a second surface portion which is opposed to the said first surface portion, the second surface portion being a reflectant surface portion, the first surface portion normally forming an interface between the body of translucent material and the air of the atmosphere, the interface having a given optical critical angle, means for directing flow of radiant energy into the body of translucent material at a given portion thereof so that the radiant energy engages said first surface portion at a given angle which is greater than the critical angle of said interface at said first surface portion, the radiant energy thus being reflected angularly between the said opposed surface portions of the body of translucent material so that the radiant energy normally is emitted from the body of translucent material at a second portion thereof, the second portion being spaced from said given portion thereof, means for sensing flow of radiant energy from said second portion of the body of translucent material, means for reducing the temperature of the body of translucent material so that dew forms upon said first surface portion thereof, thus creating an interface at such first surface portion which includes a condensate so that the critical angle of at least a part of the interface changes and becomes greater than the given angle at which the radiant energy engages the first surface portion so that at least some of the radiant energy is refracted through said first surface portion and a lesser amount of radiant energy is emitted from said second portion of the body of translucent material to the means for sensing flow of reflected radiant energy, means for determining the temperature of said first surface portion of the body of translucent material.

2. The apparatus of claim 1 in which the means for reducing the temperature of the body of translucent material includes cooling apparatus disposed in heat transfer relationship with the body of translucent material.

3. The apparatus of claim 2 in which the cooling apparatus is in firm engagement with a portion of the body of translucent material.

4. The apparatus of claim 3 in which the cooling apparatus is in firm engagement with the second surface portion of the body of translucent material.

5. The apparatus of claim 1 in which the body of translucent material comprises a body of crystalline material.

6. The apparatus of claim 5 in which the crystalline material is quartz.

7. The apparatus of claim 5 in which the crystalline material is sapphire.

8. The apparatus of claim 5 in which the crystalline material is diamond.

9. The apparatus of claim 5 in which the crystalline materail is fused silica.

10. Apparatus for determining the dew point of a gas comprising:

a body of translucent material, the body of translucent material having a pair of opposed side surfaces, there being a first side surface and a second side surface, at least one of said side surfaces being exposed to the gas, each side surface which is exposed to the gas establishing a translucent material-gas interface which has a given critical angle, the body of crystalline material also having a pair of end surfaces, there being a first end surface and a second end surface, the end surfaces being angularly disposed with respect to the side surfaces, the body of translucent material being capable of transmittance of light energy therethrough, a source of light energy adjacent the first end surface of the body of translucent material, the source of light energy emitting light energy so that a portion thereof flows into the body of translucent material through the first end surface thereof, the light energy traveling through the body of translucent material to one of the side surfaces thereof, the light energy engaging the side surface at an angle which is greater than the critical angle of said translucent material-gas interface so that substantially all of the light energy is reflected from said interface, the reflected light energy being emitted from the body of translucent material through the second end surface thereof, means for cooling the body of translucent material so that vapor condenses upon each side surface thereof which is exposed to the gas so that the interface established thereby becomes a translucent material-condensate interface having a critical angle which is greater than the angle of incidence at which the light energy engages the interface so that at least some refraction of the light energy occurs at the interface, and thus there is a reduction in the amount of light energy which is emitted from the body of translucent material through the second and end surface thereof, means for determining a change in the amount of light energy which is emitted from the translucent material through the second end surface thereof.

11. The apparatus of claim 10 which includes means for determining the temperature of a side surface which is exposed to the gas at which there is a reduction in the light energy which is emitted from the body of translucent material through the second end surface thereof.

12. The apparatus of claim 10 in which the first end surface is substantially normal to the direction of travel of light energy which flows into the body of translucent material through the first end surface thereof.

13. The apparatus of claim 10 in which the second end surface is substantially normal to the direction of travel of the light energy which is emitted therefrom.

14. The apparatus of claim 10 which includes means for determining a change in the amount of light energy which is refracted through an interface which is established at a side surface of the body of translucent material.

15. The apparatus of claim 10 which includes means for determining a change in the amount of light energy which is emitted by the source of ligth energy.

16. The apparatus of claim 14 which comprises electrical bridge circuit means which includes the means for determining a change in the amount of light energy which is emitted from the second end surface of the body of translucent material, the electrical bridge circuit means also including the means for determining a change in the amount of light energy which is refracted through an interface which is established at one of the side surfaces of the body of translucent material.

17. The apparatus of claim 15 which comprises electrical bridge circuit means which includes the means for determining a change in the amount of light energy which is emitted from the second end surface of the body of translucent material, the electrical bridge circuit means also including the means for determining a change in the amount of light energy which is emitted by the source of light energy.

18. The method of determining the dew point of a gas comprising:

positioning a body of translucent material so that a first surface portion thereof is engaged by the gas, the body of translucent material having a second surface portion which is opposed to the first surface portion, passing light energy into the body of translucent material at an angle such that when said first surface portion thereof is relatively free from dew the light energy which engages the first surface portion is substantially totally reflected to the second surface portion and is emitted by reflection from the body of translucent material, cooling the body of translucent material until precipitation from the gas forms on the first surface portion so that some of the light energy which passes into the body of translucent material is refracted through the first surface portion, thus causing a reduction in the amount of light energy which is emitted by reflection from the body of translucent material, determining the temperature of the first surface portion at which a reduction occurs in the amount of light energy which is emitted by reflection from the body of translucent material.

19. The method of determining the dew point of a gas comprising:

positioning a body of translucent material so that a surface portion thereof is engaged by the gas, passing light energy into the body of translucent material at such an angle that the light energy engages said surface portion of the body and is substantially totally reflected therefrom when the temperature of the surface portion is above the dew point of the gas, some of the light energy which passes into the body of translucent material being refracted through said surface portion when the temperature of the surface portion which is engaged by the gas is lowered so that dew forms upon said surface portion, there thus being a reduction in the amount of light energy which is reflected from said surface portion of the body of translucent material, determining the temperature of said surface portion of the body of translucent material at which a reduction occurs in the amount of light energy which is reflected from said surface portion of the body of translucent material.

References Cited

UNITED STATES PATENTS

| Re. 23,287 | 10/1950 | Friswold et al. | 73—17 |
| 2,376,209 | 5/1945 | Turin | 73—17 |
| 2,620,660 | 12/1952 | Goldsmith | 73—327 XR |
| 3,120,125 | 2/1964 | Vasel | 73—293 |
| 3,252,319 | 5/1966 | Wood et al. | 73—17 |

FOREIGN PATENTS 925,004  5/1961  Great Britain.

RICHARD C. QUEISSER, Primary Examiner

J. K. LUNSFORD, Assistant Examiner

U.S. Cl. X.R.

73—29, 336.5